United States Patent Office 3,309,368
Patented Mar. 14, 1967

3,309,368
SUBSTITUTED ISOXAZOLES AND METHODS OF PREPARING THE SAME
Shreekrishana Manmohan Gadekar, Valley Cottage, and Elliott Cohen, Pearl River, N.Y., assignors to American Cyanamid Company, Stamford, Conn., a corporation of Maine
No Drawing. Filed Nov. 19, 1965, Ser. No. 508,820
10 Claims. (Cl. 260—256.4)

This invention relates to new organic compounds. More particularly, it relates to novel substituted 3-amino-4H-pyrrolo[3,4-c]isoxazoles, derivatives thereof and methods of preparing the same.

The novel compounds of the present invention may be represented by the following formula:

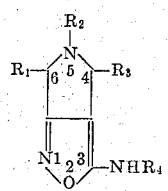

wherein $R_1$ and $R_3$ are selected from the group consisting of hydrogen and lower alkyl; $R_2$ is selected from the group consisting of lower alkanoyl, carbo(lower)alkanoyloxy, trimethoxybenzoyl, 5-chloro-2-pyrimidinyl and carbobenzyloxyl; and $R_4$ is selected from the group consisting of hydrogen, lower alkanoyl, trifluoroacetyl and trimethoxybenzoyl. The invention includes within its scope, the above described compounds and tautomeric forms described hereinafter.

In general the novel compounds of this invention are white crystalline solids, soluble in many organic solvents, as for example, acetone and lower alkyl alcohols and are relatively insoluble in water.

The compounds of this invention may be prepared by a sequence of reactions as illustrated in the flowsheet immediately following:

FLOWSHEET

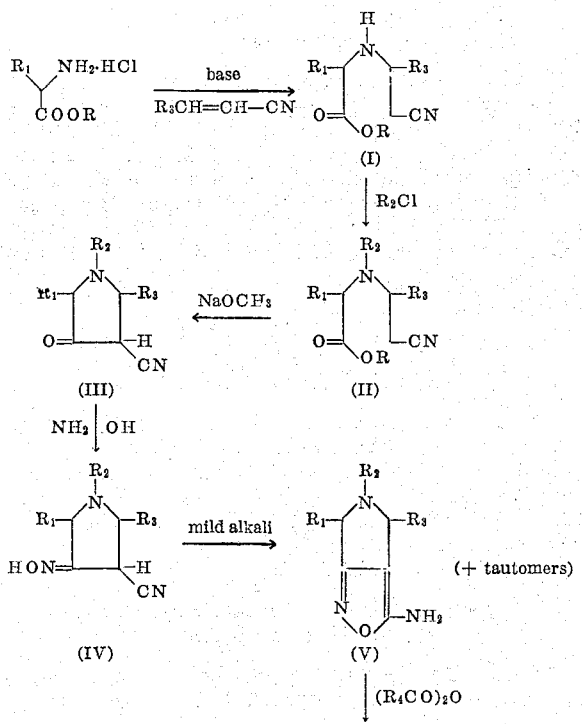

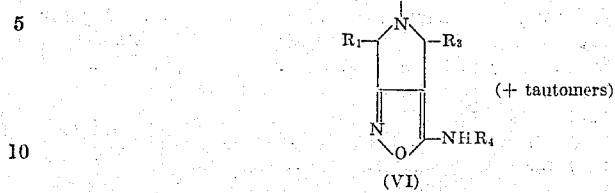

wherein $R_1$, $R_2$, $R_3$ and $R_4$ are as defined above and R is lower alkyl.

In the above Flowsheet, for example, a condensation reaction of ethyl glycinate hydrochloride ($R_1$=H) or methyl alaninate hydrochloride ($R_1$=CH_3) with acrylonitrile ($R_3$=H) or crotononitrile ($R_3$=CH_3) produces the corresponding addition product (I). Acylation of (I) with $R_2$Cl, under conditions described in the examples, forms compound (II). Ring closure of compound (II) with an appropriate alkali metal alcoholate forms the pyrrolidine-3-one, compound (III). The oximino compound (IV), is prepared from compound (III) by treatment with hydroxylamine. Ring closure of compound (IV) with mild alkali yields the novel pyrrolo[3,4-c]isoxazoles, product (V). Treatment of product (V) yields the corresponding acylated products (VI).

A product of the present invention in which $R_1$, $R_3$, and $R_4$ are hydrogen and $R_2$ is 5-chloro-2-pyrimidinyl, e.g., a typical novel compound, may be prepared in the following manner: Ethyl glycinate hydrochloride is condensed with acrylonitrile in an alkaline aqueous medium to yield the addition compound ethyl N-(2-cyanoethyl)-glycinate. Both of the starting compounds are well known and readily available organic compounds. Treatment of the resulting ethyl N-(2-cyanoethyl)glycinate with 2,5-dichloropyrimidine at temperatures of about 90°–160° C., preferably at 130°–140° C. for from 1 to 6 hours, preferably about 4 hours, produces the compound ethyl N-(2-cyanoethyl) - N-(5-chloro-2-pyrimidinyl)glycinate. (Example 5.) Ring closure of the latter compound is effected with an alkali metal alkoxide, as for example, sodium methoxide, in an inert solvent such as anhydrous toluene or xylene. This reaction takes place at room temperature or with gentle heating. Generally, the reacting time is from about 2 to 6 hours, but preferably from 4 to 5 hours. The precipitated alkali metal salt is recovered, dried and acidified to produce 1-(5-chloro-2-pyrimidinyl)-4-oxo-3-pyrrolidinecarbonitrile. (Example 10.) Refluxing of the resultant compound with hydroxylamine hydrochloride and sodium acetate in ethanol for about two hours produces the oximino derivative. (Example 14.) Mild alkaline treatment of 1-(5-chloro-2-pyrimidinyl)-4-oximino-3-pyrrolidinecarbonitrile at room temperature cyclizes the latter compound to produce 3-amino-5,6-dihydro-5(5-chloro-2-pyrimidinyl)-4H-pyrrolo[3,4-c]isoxazole. (Example 18.)

When $R_4$ is hydrogen then the present compounds may exist in tautomeric forms which can be represented as follows:

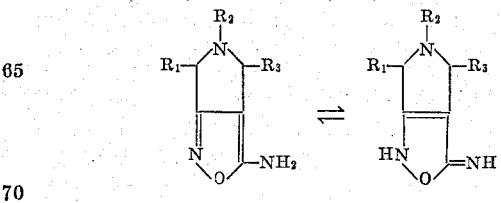

The description of one form the present compounds is intended to include the tautomers thereof.

Novel products of this invention comprise an entirely new class of organic chemical compounds formed by the fusion of the pyrrole and isoxazole ring structures. The compounds have been found to be physiologically effective as diuretic and antihypertensive agents in warm-blooded animals.

The diuretic properties of representative novel products of this invention in rats were determined according to the following test procedure. Mature male rats weighing between 180 and 300 grams were allowed a normal fluid intake prior to testing. A single oral administration of the test product was given in 2 percent aqueous starch suspension. Four cages (2 rats per cage) served as controls for each measurement. Control animals received only the starch suspension. After administration, the test animals were placed in metabolism cages and observations of the amount of urine excreted were made after 5 hours and after 24 hours. These urine measurements were then adjusted to compensate for differing weights of individual animals. The final values recorded were the ratios of the adjusted amount of urine excreted by the test rats to the adjusted amount of urine excreted by the control rats.

The hypotensive properties of representative novel products in rats were determined according to the following test procedure. Conscious male rats averaging approximately 200 grams in weight were fastened to rat boards in a supine position by means of canvas vests and limb ties. The femoral areas were anesthetized (subcutaneous infiltration), and the left or right iliac arteries were exposed and clamped off proximally by an artery clamp and distally with thread. Incisions were made near the tie and short nylon catheters were inserted and tied in place. The other end of the catheters were fitted with 24 gauge hubless needles attached to thick-walled polyethylene tubes. The products were administered to the animals orally by gavage (stomach tube). The test compounds were ordinarily suspended or dissolved in 2 percent aqueous starch solution at a concentration such that 1 milliliter per 100 grams of body weight gave the animal the desired dose. Mean arterial blood pressure was measured 2 hours after administration of the compounds. Comparisons were then made to the mean control pressure of 113 mm. Hg±5 which is the average and standard deviation of a number of controls recorded over months of testing. Blood pressure measurements were made with four Statham P23 Db strain gauges (Statham Instruments, Inc., Los Angeles, California), attached to a Sanborn Polyviso Recorder. The Sanborn Polyviso Recorder is equipped with four strain gauge preamplifiers with averaging circuits for measuring mean arterial pressure. It was found that warm-blooded animals exhibited diuretic and antihypertensive activity in the dosage range of 5 mg./kg. to about 50 mg./kg.

The invention will be described in greater particularity in conjunction with the following specific examples describing in detail preparation of intermediates and representative substituted 3-amino-4-pyrrolo [3,4-c]isoxazoles.

EXAMPLE 1

*Preparation of methyl N-(2-cyanoethyl)alaninate*

To an ice-cold solution of 14 g. (0.1 mole) of methyl alaninate hydrochloride in 20 ml. of water containing 5.6 g. (0.1 mole) of potassium hydroxide is added 6.9 g. (0.13 mole) of acrylonitrile. The mixture is heated over a steam bath for 5 hours and the separated oil is removed by extraction with ether. The extract is dried over anhydrous magnesium sulfate and then distilled. Methyl N-(2-cyanoethyl)alaninate is obtained distilling at 95°–96° C./0.3 mm., $N_D^{24}$ 1.4463, 7.1 g. (47% yield).

EXAMPLE 2

*Preparation of β-(carbethoxymethyl)aminobutyronitrile*

The procedure of Example 1 is repeated with 14 g. (0.1 mole) of ethyl glycinate hydrochloride, 6.8 g. (0.1 mole) of crotononitrile and 5.6 g. (0.1 mole) of potassium hydroxide. The product described above is obtained; boiling point 111°–113° C./1.0 mm.

EXAMPLE 3

*Preparation of methyl N-carbethoxy-N-(2-cyanoethyl)alaninate*

An ice-cold mixture of 5.0 g. (0.032 mole) of the cyanoester from Example 1, 2.7 g. (0.032 mole) of sodium bicarbonate and 20 ml. of water is treated with 3.5 g. (0.032 mole) of ethyl chloroformate. The mixture is stirred for 4 hours, and the product is extracted with ether. Distillation of the ether extract yields 6.05 g. (82%) of the carbethoxycyanoester, boiling point 130°–132° C./0.5 mm., $N_D^{24}$ 1.4519.

EXAMPLE 4

*Preparation of ethyl β-(2-cyanoethyl)-3,4,5-trimethoxyhippurate*

An ice-cold solution of 7.8 g. (0.05 mole) of ethyl β-cyanoethyl glycinate in 20 ml. of p-dioxane and 7.3 ml. of triethylamine is treated with another solution of 11.5 g. (0.05 mole) of 3,4,5-trimethoxybenzoyl chloride in 35 ml. of p-dioxane. The mixture is stirred for 6 hours and the resultant triethylamine hydrochloride is filtered off. The filtrate is evaporated to an oil from which a solid precipitates and is separated by filtration. The precipitate is recrystallized from ethanol to give a crystalline product melting at 87°–88° C., yield 9.4 g. (54%).

EXAMPLE 5

*Ethyl N-(2-cyanoethyl)-N-5-chloro-2-pyrimidinyl)glycinate*

A mixture containing 31.2 g. (0.2 mole) of ethyl β-cyanoethylglycinate and 14.9 g. (0.1 mole) of 2,5-dichloropyrimidine is heated at 130°–140° C. for 4 hours. The mixture is then cooled and triturated with 450 ml. of ether. The insoluble solid is removed and the filtrate is evaporated down to a syrup which then crystallizes. The material is recrystallized from aqueous ethanol (50%) to yield 14.8 g. (56%) of crystalline, white product melting at 54°–55° C.

EXAMPLE 6

*Preparation of ethyl N-carbobenzyloxy-N-(2-cyanoethyl)glycinate*

A mixture containing 23.4 g. (0.15 mole) of ethyl 2-cyanoethylglycinate, 12.6 (0.15 mole) of sodium bicarbonate and 150 ml. of water is treated with 25.5 g. (0.15 mole) of carbobenzyloxy chloride at 25° C. The mixture is stirred for 4 hours and then extracted with ether. Distillation of the ether extracts under reduced pressure affords 23.4 g. (54% yield) of ethyl N-carbobenzyloxy-N-(2-cyanoethyl)glycinate, boiling point 204°–205° C./1.5 mm., $N_D^{25}$ 1.5072.

EXAMPLE 7

*Preparation of β-(carbethoxymethyl)-N-carbethoxyaminobutyronitrile*

The procedure of Example 3 is repeated using 5.0 g. (0.029 mole) of β-(carbethoxymethyl)aminobutyronitrile from Example 2 and 3.5 g. (0.032 mole) of ethyl chloroformate. β-(carbethoxymethyl) - N - carbethoxyaminobutyronitrile is isolated in high yield, boiling point 145°–147° C./0.5 mm.

EXAMPLE 8

*Preparation of ethyl 4-cyano-2-methyl-3-oxo-1-pyrrolidine-carboxylate*

A quantity of the carbethoxycyanoester from Example 3, 5.0 g. (0.022 mole), is cyclized to the pyrrolidone by adding it to a well agitated suspension of 1.2 g. (0.022 mole) of sodium methoxide in 15 ml. of anhydrous toluene. The precipitated sodium salt is separated by filtration and dried. The pyrrolidone is obtained by acidification of the solution of the sodium salt in 10 ml. of water with 5 N HCl. The desired product is recovered in 63 percent yield (2.7 g.), melting point 86°–87° C.

EXAMPLE 9

*Preparation of 4-oxo-1-(3,4,5-trimethoxybenzoyl)- 3-pyrrolidinecarbonitrile*

A mixture containing 18.0 g. (0.05 mole) of the cyanoester from Example 4, 2.7 g. (0.05 mole) of sodium ethoxide and 100 ml. of toluene is stirred at room temperature for 5 hours. The resultant solid is filtered off, dried and dissolved in a minimum amount of water. The solution is made acid with 5 N hydrochloric acid and the oil is extracted with chloroform. Evaporation of the solvent from the combined extracts yields an oil which crystallizes to a solid. The crude product is purified by recrystallization from benzene. The purified product, a white solid, is obtained in 43 percent yield (6.4 g.), melting point 76°–78° C.

EXAMPLE 10

*Preparation of 1-(5-chloro-2-pyrimidinyl)- 4-oxo-3-pyrrolidinecarbonitrile*

A solution of 6.3 g. (0.026 mole) of the cyanoester from Example 5 in 50 ml. of anhydrous toluene is treated with 1.5 g. (0.026 mole) of sodium methoxide. The mixture is stirred for 4 hours and the resultant solid is filtered off, dried and dissolved in 100 ml. of water. The pyrrolidone is isolated by acidifying the aqueous solution with 5 N hydrochloric acid and filtering off the solid. On recrystallization of the crude product from ethanol, 2.6 g. (46% yield) of the purified product is obtained, melting point 225°–227° C.

EXAMPLE 11

*Preparation of ethyl 3-cyano-4-oximinopyrrolidine- 1-carboxylate*

A mixture containing 8.0 g. (0.04 mole) of the cyanopyrrolidone, 2.8 g. (0.04 mole) of hydroxylamine hydrochloride, 3.3 g. of sodium acetate and 100 ml. of 95% ethanol is refluxed for 2 hours. The mixture is filtered and the filtrate is evaporated to an oily residue which crystallized when standing in the cold. The solid is recrystallized from a mixture of n-hexane and ethyl acetate yielding 3.3 g. (42% yield), melting point 131°–132° C.

EXAMPLE 12

*Preparation of ethyl 4-cyano-2-methyl-3- oximino-1-pyrrolidinecarboxylate*

Following the general procedure described in Example 11, 1.0 g. (0.005 mole) of the pyrrolidone from Example 8 is converted into the desired oximino compound. On recrystallization from ethanol, 0.43 g. (41% yield) of purified material is obtained, melting point 123°–125° C.

EXAMPLE 13

*Preparation of 4-oximino-1-(3,4,5-trimethoxybenzoyl)- 3-pyrrolidinecarbonitrile*

A mixture of 1.2 g. (0.004 mole) of the pyrrolidone from Example 9, 0.25 g. (0.004 mole) of hydroxylamine hydrochloride, 0.16 g. (0.004 mole) of sodium acetate and 25 ml. of 95% ethanol is refluxed for 2 hours. The sodium chloride is filtered off and discarded and the oxime is isolated by evaporation of the filtrate, 0.56 g., melting point 205°–207° C. dec. The analytical sample is recrystallized from ethanol.

EXAMPLE 14

*Preparation of 1-(5-chloro-2-pyrimidinyl)-4- oximino-3-pyrrolidinecarbonitrile*

A mixture containing equimolar quantities (0.002 mole) of 0.5 g. of the pyrrolidone from Example 10, 0.14 g. of hydroxylamine hydrochloride, 0.164 g. of sodium acetate and 10 ml. of ethanol is refluxed for 2 hours and filtered. The oxime is collected by evaporating the filtrate to a solid residue and triturating with water, 0.39 g. (80% yield). On recrystallization from ethanol, the purified product melts at 183°–185° C.

EXAMPLE 15

*Preparation of ethyl 3-amino-4H-pyrrolo [3,4-c]isoxazole-5(6H)carboxylate*

A 1.1 g. (0.0056 mole) quantity of the oxime from Example 11 is dissolved in 10 ml. of 0.1 N sodium hydroxide. A solid precipitates from the clear solution which is filtered off, washed with ice-water and dried, 0.9 g. (82% yield), melting point 177°–179° C. dec.

EXAMPLE 16

*Ethyl 3-amino-6-methyl-4H-pyrrolo[3,4-c] isoxazole-5(6H)carboxylate*

A 100 mg. (0.00046 mole) quantity of the oxime from Example 12 is dissolved in 5 ml. of 1 N sodium hydroxide. The aminoisoxazole is precipitated from the solution, filtered off and recrystallized from water to give 0.08 g. (80% yield) of the purified material, melting point 115°–117° C.

EXAMPLE 17

*Preparation of 3-amino-5,6-dihydro-5-(3,4,5-trimethoxybenzoyl)-4H-pyrrolo[3,4-c]isoxazole*

The desired aminoisoxazole is precipitated when a solution of (0.002 mole) of the oxime from Example 13 in 5 ml. of 1 N sodium hydroxide is allowed to stand at room temperature for several minutes. On recrystallization from acetone, 0.4 g. (66% yield), melting point 170°–172° C. of the purified product is obtained.

EXAMPLE 18

*Preparation of 3-amino-5,6-dihydro-5-(5-chloro-2- pyrimidinyl)-4H-pyrrolo[3,4-c]isoxazole*

The desired aminoisoxazole is precipitated when a solution of 0.2 g. (0.0008) of the oxime from Example 14 in 2 ml. of 1 N sodium hydroxide is allowed to stand at room temperature for a few minutes. On recrystallization from ethanol, 0.1 g. (50% yield), melting point 160°–162° C. of the purified product is obtained.

EXAMPLE 19

*Preparation of benzyl 3-amino-4H-pyrrolo [3,4-c]isoxazole-5(6H)carboxylate*

A solution of 1.5 g. (0.005 mole) of the carbobenzyloxycyanoester from Example 6 in 35 ml. of anhydrous toluene is stirred with 0.27 g. (0.005 mole) of sodium methoxide for 6 hours. The sodium salt of the desired cyanopyrrolidone precipitates and is separated by filtration and dried. This salt is dissolved in a minimum amount of water, acidified with 5 N hydrochloric acid and the resultant gum is extracted with ether. Removal of the solvent from the extract affords 0.8 g. (0.003 mole) of the cyanopyrrolidone. Without further purification this material is reacted with 0.21 g. (0.003 mole) of hydroxylamine hydrochloride and 0.25 g. (0.003 mole) of sodium acetate. The mixture is refluxed and filtered, the precipitate being discarded. On evaporation of the filtrate the oxime is obtained as an oil. The oil is then suspended in 3 ml. of water and 5 ml. of 1 N sodium hydroxide is added. The aminoisoxazole precipitates from the alkaline mixture and is collected by filtration 0.43 g. (51% yield), melting point 139°–141° C.

EXAMPLE 20

*Preparation of 5-acetyl-3-amino-5,6-dihydro-4H-pyrrolo[3,4-c]isoxazole*

A mixture containing equimolar quantities (0.002 mole) of 3.8 g. of 1-acetyl-4-oxo-3-pyrrolidinecarbonitrile, hydroxylamine hydrochloride, sodium acetate and 50 ml. of ethanol is refluxed for 2 hours. The sodium chloride is filtered off and the filtrate is evaporated to an oil. The oil is suspended in 5 ml. of water and 1 N sodium hydroxide is added. The mixture is allowed to stand at room temperature for several minutes after which time the aminoisoxazole precipitates. The crude product is filtered, dried and recrystallized from ethanol, 1.8 g. (43% yield), melting point 176°–178° C.

EXAMPLE 21

*Preparation of ethyl 3-acetamido-4H-pyrrolo[3,4-c]isoxazole-5(6H)carboxylate*

A gently-stirred suspension of 2.0 g. (0.01 mole) of the aminoisoxazole from Example 15 in 5.0 ml of acetic anhydride is heated until a clear solution is obtained, (approximately 5 to 10 minutes). The reaction mixture is cooled, filtered and the solid is recrystallized from ethanol, 1.5 g. (63% yield), melting point 195°–196° C.

EXAMPLE 22

*Preparation of ethyl 3-propionamido-4H-pyrrolo[3,4-c]isoxazole-5(6H)carboxylate*

A mixture of 5.9 g. (0.03 mole) of the aminoisoxazole from Example 15 and 20 ml. of freshly-distilled propionic anhydride is stirred and gently heated until a clear solution is obtained (approximately 10 minutes). The reaction mixture is cooled and the crude product removed by filtration. On recrystallization from acetone, 4.0 g. (52% yield) of the purified product is obtained, melting point 203°–204° C.

EXAMPLE 23

*Preparation of ethyl 3-(2,2,2-trifluoroacetamido)-4H-pyrrolo[3,4-c]isoxazole-5(6H)carboxylate*

A mixture of 5 g. (0.025 mole) of the amino-isoxazole from Example 15 and 10 ml. of trifluoroacetic anhydride is stirred until an exothermic reaction takes places and a solid precipitates. After a few minutes the mixture is cooled and the solid is dissolved in 80 ml. of ethanol. The solution is clarified with decolorizing charcoal and filtered. On cooling, the filtrate yields 4.2 g. (52% yield) of crystalline product, melting point 188°–190° C.

EXAMPLE 24

*Preparation of ethyl 3-(3,4,5-trimethoxybenzamido)-4H-pyrrolo[3,4-c]isoxazole-5(6H)carboxylate*

A mixture of 1.0 g. (0.005 mole) of the amino-isoxazole from Example 15, 0.4 g. (0.005 mole) of pyridine and 20 ml. of chloroform is treated with 1.15 g. (0.005 mole) of 3,4,5-trimethoxybenzoyl chloride at 20° C. The mixture is refluxed for 1 hour and allowed to stand at room temperature for 20 hours. The mixture is filtered and the precipitate discarded. The filtrate is reduced to a gum at 40° C. under diminished pressure. The gum is triturated with dilute sodium hydroxide and the insoluble material is filtered off. The filtrate is diluted with 10 ml. of water, heated to reflux, decolorized with charcoal and filtered. A crystalline solid is obtained from the filtrate, 0.6 g. (30% yield). On recrystallization from ethanol, the purified material melts at 181°–183° C.

We claim:

1. A pyrroloisoxazole of the formula:

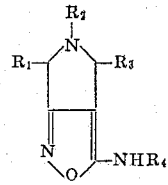

wherein $R_1$ and $R_3$ are selected from the group consisting of hydrogen and lower alkyl; $R_2$ is selected from the group consisting of lower alkanoyl, carbo(lower)alkanoyloxy, trimethoxybenzoyl, 5-chloro-2-pyrimidinyl and carbobenzyloxyl; and $R_4$ is selected from the group consisting of hydrogen, lower alkanoyl, trifluoroacetyl and trimethoxybenzoyl.

2. The compound in accordance with claim 1 wherein the pyrroloisoxazole is ethyl 3-amino-4H-pyrrolo[3,4-c]isoxazole-5(6H)carboxylate.

3. The compound in accordance with claim 1 wherein the pyrroloisoxazole is ethyl 3-amino-6-methyl-4H-pyrrolo[3,4-c]isoxazole-5(6H)carboxylate.

4. The compound in accordance with claim 1 wherein the pyrroloisoxazole is 3-amino-5,6-dihydro-5-(5-chloro-2-pyrimidinyl)-4H-pyrrolo[3,4-c]isoxazole.

5. The compound in accordance with claim 1 wherein the pyrroloisoxazole is benzyl 3-amino-4H-pyrrolo[3,4-c]isoxazole-5(6H)carboxylate.

6. The compound in accordance with claim 1 wherein the pyrroloisoxazole is 5-acetyl-3-amino-5,6-dihydro-4H-pyrrolo[3,4-c]isoxazole.

7. The compound in accordance with claim 1 wherein the pyrroloisoxazole is ethyl 3-acetamido-4H-pyrrolo[3,4-c]isoxazole-5(6H)carboxylate.

8. The compound in accordance with claim 1 wherein the pyrroloisoxazole is ethyl 3-(2,2,2-trifluoroacetamido)-4H-pyrrolo[3,4-c]isoxazole-5(6H)carboxylate.

9. The compound in accordance with claim 1 wherein the pyrroloisoxazole is ethyl 3-(3,4,5-trimethoxybenzamido)-4H-pyrrolo[3,4-c]isoxazole-5(6H)carboxylate.

10. A method of preparing pyrroloisoxazoles of the formula:

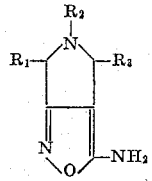

wherein $R_1$ and $R_3$ are selected from the group consisting of hydrogen and lower alkyl and $R_2$ is selected from the group consisting of lower alkanoyl, carbo(lower)alkanoyloxy, trimethoxybenzoyl, 5-chloro-2-pyrimidinyl and carbobenzyloxyl which comprises contacting a compound of the formula:

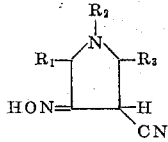

wherein $R_1$, $R_2$ and $R_3$ are as defined above, with mild alkali and recovering said compounds therefrom.

No references cited.

ALEX MAZEL, *Primary Examiner.*

MARY O'BRIEN, *Assistant Examiner.*